Patented Oct. 20, 1942

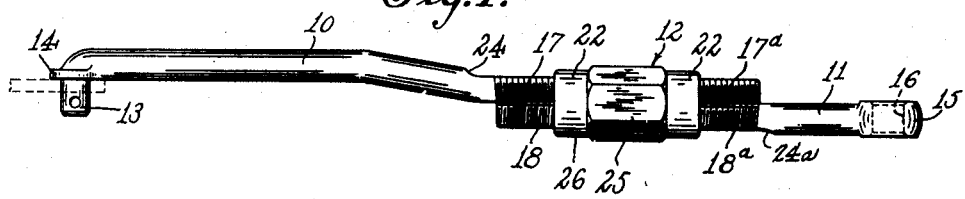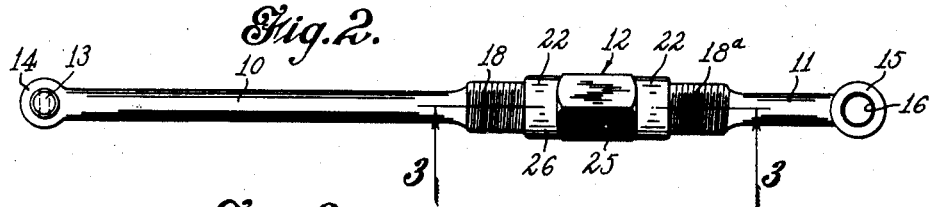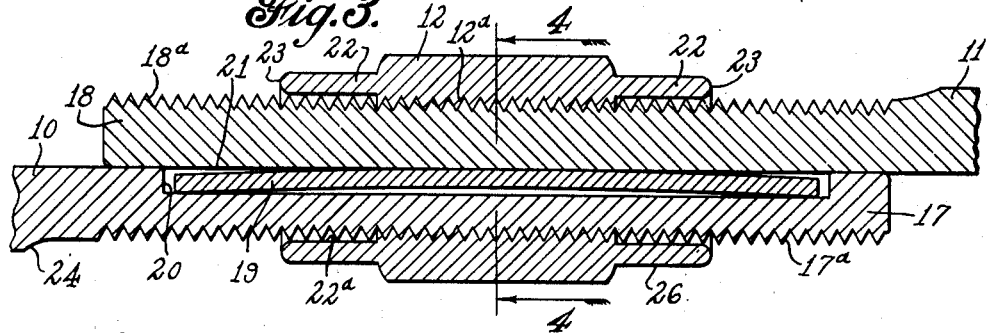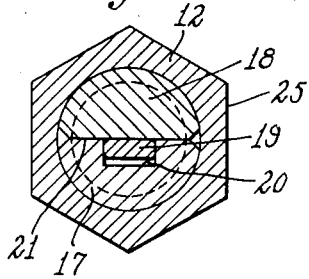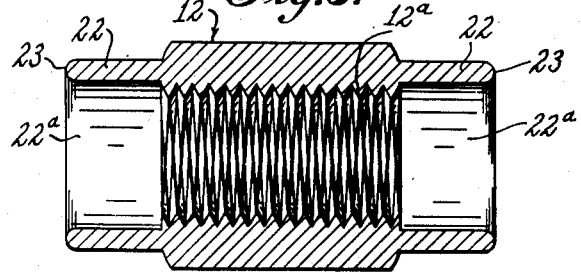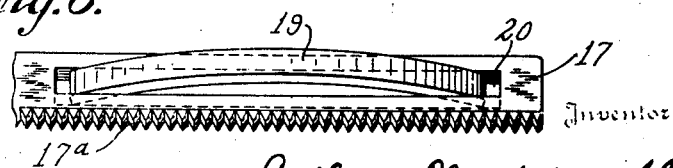

2,299,526

UNITED STATES PATENT OFFICE 2,299,526

TURNBUCKLE

Arthur Claud-Mantle, Trumbull, Conn., assignor to The Bassick Company, Bridgeport, Conn., a corporation of Connecticut Application June 25, 1941, Serial No. 399,748

10 Claims. (Cl. 287—60)

This invention relates to turnbuckles, and has special reference to articles of this class used to provide small linear adjustments in connection with the installation and operation of rather delicate mechanisms, for example, moving parts of carburetors and other devices where it is important to provide a nice, exact adjustment and to maintain that adjustment notwithstanding vibrations or other adverse conditions to which the mechanism might be subjected.

Many years ago it was proposed to construct a turnbuckle of two half-round parts, threaded on their half-round surfaces with right and left threads respectively, and an adjusting or metering nut threaded to conform to the threads on said parts, and adapted, when rotated, to draw their projecting end portions closer together, or to move them away from each other, depending upon the direction of rotation of the nut. Since that time other improvements in turnbuckles of that general type have been suggested, particularly with a view of providing a device of this nature which would be commercially practicable. Notwithstanding these efforts, however, a commercially practicable successful device of this nature has not, so far as I am advised, been available to the trade, notwithstanding the demand for an effective adjusting device of this nature.

One of the objects which I have in view is to provide a successful, commercially practicable device by overcoming the defects of prior devices.

I ascribe the failure, or at any rate the lack of use, of prior turnbuckles or adjusting links of this general type to the fact that it has been impossible to maintain the right and left threads of the nut in proper and effective engagement with the threads of the respective linearly moving parts, and another object of my present invention is to provide notable improvement in this respect.

To these and other ends, the invention consists in the novel features and combinations of parts to be hereinafter described and claimed.

In the accompanying drawing:

Fig. 1 is an elevation of a turnbuckle constructed in accordance with my invention, the same being of a kind adapted to act as an adjusting link for a carburetor or other mechanism;

Fig. 2 is a view taken at 90 degrees to Fig. 1;

Fig. 3 is an enlarged section on line 3—3 of Fig. 2;

Fig. 4 is a section on line 4—4 of Fig. 3;

Fig. 5 is a longitudinal section of the nut; and

Fig. 6 is a detail perspective view showing the socketed spring in one of the linearly movable members.

In the drawing, I have shown as an example a link suitable for carburetor adjustment and like purposes, equipped with a turnbuckle embodying my invention, one of the half-round parts of the turnbuckle being continued to provide a rather long arm, on which a lever or the like can be pivoted, the other half-round part being continued into a relatively short part or arm having a boss provided with a perforation for pivoting or like purposes. However, the character of the members attached to the respective half-round linearly moving parts can be greatly varied in order to suit the various conditions of use. The half-round parts carry on their outer round surfaces threads of opposite hand respectively, and the adjusting or metering nut is provided with interior right hand threads, and also with interior left hand threads, engaging the threads of the half-round parts in such a manner that when the nut is rotated in one direction the outer extremities of the link are drawn toward each other, whereas when the nut is rotated in the opposite direction the link extremities are moved away from each other.

In the drawing, one of the linearly movable members is shown at 10, the other one at 11, and the nut at 12. The member 10 is the long one above mentioned, and this carries at its free extremity a short cross shaft 13, which may serve for the pivotal connection or mounting of a lever or like element (not shown), forming a part of the control connections. It will be noted that the lever, if used, may swing in a plane close and approximately parallel to a plane passing lengthwise through the axis of the nut, this being indicated by the dotted lines at the left of Fig. 1. At the base of the cross shaft 13 a boss 14 is formed on member 10, the function of this being to maintain parallelism of the lever or other element swingingly mounted on the cross shaft 13. Member 11 is the shorter member above referred to, and this member is provided at its free extremity with a boss 15, having a perforation 16, which in this particular case has its axis parallel to the cross shaft 13.

The half-round portion of the turnbuckle which is connected to member 10, is shown at 17, and the half-round portion of member 11 is shown at 18, and the outer round surfaces of these parts carry threads of opposite hand, as indicated at 17a and 18a respectively. The nut 12 has its interior bore provided over the same region with threads of opposite hand in intersecting relation, as indicated at 12a in Fig. 5, the right hand thread engaging one of the members of the link, and the left hand thread engaging the other member, so that the effect of rotating the nut will be as above described.

In a device of this character it is of the highest importance that there be at all times close and effective engagement between the threads of each half-round part and the co-acting threads of the nut. Any lost motion is detrimental, and yet on the other hand it is essential that the co-acting threaded surfaces have a relative movement which is sufficiently free, with elimination of binding, twisting and jamming. In many installations it is essential that the alignment initially set up between the respective free ends of the link be preserved under varying conditions of use. It is also desirable that for purposes of mass production the process of forming the threads on the external surfaces of the half-round portions be not too intricate or expensive. I have discovered that these conditions can be met by providing between the overlapping ends of the link members, where they are embraced by the nut, a resilient member which yieldingly urges the overlapping ends away from each other in a transverse direction for the purpose of pressing the external threads yieldingly into engagement with the co-acting internal threads of the nut. For this purpose I prefer to employ a leaf spring between the half-round members, and preferably this is a deflection spring normally having the form of a shallow bow or arc. It is also preferred to have this spring socketed in one of the half-round members at the inner face thereof, with the intermediate portion of the spring bow normally protruding from the socket and engaging the flat inner face of the other half-round member. Such a preferred construction is illustrated in the drawing, in which the deflection spring is shown at 19 and the socket for the spring is shown at 20, this socket being in the nature of an elongated groove. In the particular case shown the socket 20 is formed in the member 10, but it might, if desired, be formed in the member 11.

Preferably the spring 19 has initially about the amount of bow shown in Fig. 6, which shows the position of the spring when placed in its socket 20 for assembly. This spring is generally of the character of a leaf or bar, and at the sides it fits rather closely within the elongated rectangular socket 20. When the spring is in the position in Fig. 6, the greater portion of its body projects upwardly out of the socket, but when the parts are in fully assembled position, as shown in Fig. 3, only a portion of the spring at the middle projects beyond the plane of the socket mouth. There is thus provided a region at the middle of the spring where the latter has face contact with the flat inner face 21 of portion 18.

It will be noted that in the preferred form the socket 20 in the assembled position has its ends rather close to the ends of the spring. It will also be noted that in the preferred form the spring is, when in the operative position, of a length only slightly less than that of the threaded half-round portions. It will also be noted, however, that preferably, as in the case shown, the spring is of considerably greater length than the threaded portions of the nut. In the case illustrated the spring is more than twice as long as the threaded portion of the nut, and this provides, with a relation of the parts such as shown, a very effective engagement between the threads of the nut and the threads of the half-round portions, although I do not limit myself to any particular dimensions. It is to be observed, however, that in a device used for the adjustment of rather delicate mechanisms, large adjusting movements are not required, and that on the other hand adjustments of a few hundredths or thousandths of an inch are frequently made. Under such conditions the limits within which it will be necessary to make adjustments may be reached by giving the nut only a few turns, and while, in order to accommodate the device to many different conditions, the exteriorly threaded portions, as illustrated, are roughly three times as long as the threaded portion of the nut, it is not necessary to make them that long, and it is to be noted furthermore that the length of the nut is increased and, in this case, its amplitude of possible movement decreased, by the provision of integral centering sleeves 22 at the ends of the nut. These sleeves 22 have rounded ends 23 adapted to engage a stop shoulder 24 on member 10 or a stop shoulder 24a on member 11. The interiors of the sleeves 22 are left smooth, as shown at 22a, so as to clear the threads on the link members. These sleeves 22 are of advantage in assembling the device because one of them facilitates the introduction into the nut of one of the link members, while the other sleeve acts as a centering and guiding means when the extremity of the other link member is introduced.

Preferably the wrench-engaging portion of the nut, which is indicated at 25, is substantially co-extensive in length with the interior threaded portion, and this part may be of hexagonal shape as shown. In those regions where the sleeve portions 22 are provided, the external diameter of the nut body is reduced, as shown at 26, the external surfaces of the sleeve portions being smooth and round.

In assembling the device, the spring 19 is placed in the socket 21, as shown in Fig. 6, and its carrying link member is then inserted into the nut until the threads engage to a slight extent the threads of the nut. The other link member is then inserted form the opposite end of the nut until its threads are engaged with the nut threads. Then upon turning the nut in the proper direction, the links are drawn into it until an assembled position, such as represented by example in Fig. 3, is obtained. The parts should be so assembled that a condition, such as shown in Fig. 3, is approximated, that is, the link members are drawn into the nut to equal extents.

The method of operation will be obvious from the previous description. Usually the required adjustments are relatively small, necessitating at most only a few turns of the nut, but the device gives satisfactory service if considerably larger adjustments than that are required. The spring, having its intermediate portion pressing flatwise against one of the half-round portions, while the ends act in the opoiste direction against the other half-round portion, provides a satisfactory means for maintaining the proper engagement between the threads of the nut and the threads of the half-round portions. The rotation of the nut is effective to move the link members, and the nut turns freely without binding, the link members being maintained at all times in proper alignment. A further important advantage arises from a certain compensating effect possessed by the spring, which eliminates the necessity of close tolerance, and, more particularly, enables the threads on the half-round portions to be formed by methods involving small expense. In fact, the link members can be produced by forging, and the threads on the half-round portions formed by the forging die. This provides a relatively inexpensive structure.

It will be obvious that one of the advantages of the device arises from the fact that all that is required for the adjustment of the link to a greater or smaller length is the gripping of the nut by a wrench, and the turning of the wrench to the required degree. There is, therefore, only one part which it is necessary to manipulate, namely, the nut, and this can be readily done. Another important advantage arises from the fact that after the adjustment is effected, it will be maintained, because of the fact that any rotational tendency of the nut is overcome by its concurrent engagement, under the pressure of the spring, with both right hand and left hand threads. In practice this is a very important feature, because what in effect is a nut lock is provided, although no extra nuts are required for locking purposes.

While I have shown herein only one embodiment of my invention, it is to be understood that the invention is susceptible of various embodiments, and that various modifications and changes can be made without departing from the principles of the invention or the scope of the claims.

What I claim is:

1. A turnbuckle comprising half-round members whose external surfaces carry respectively right hand and left hand threads, a nut having sets of threads engaging respectively said right hand and left hand threads, and resilient means interposed between said half-round members and maintaining the engagement of their threads with the corresponding threads of the nut.

2. A turnbuckle comprising half-round members whose external surfaces carry respectively right hand and left hand threads, a nut having sets of threads engaging respectively said right hand and left hand threads, and resilient means interposed between said half-round members and maintaining the engagement of their threads with the corresponding threads of the nut, said resilient means comprising a leaf spring.

3. A turnbuckle comprising half-round members whose external surfaces carry respectively right hand and left hand threads, a nut having sets of threads engaging respectively said right hand and left hand threads, and resilient means interposed between said half-round members and maintaining the engagement of their threads with the corresponding threads of the nut, said resilient means being a spring in the form of a bow having its ends in engagement with one of said half-round members and its intermediate portion in engagement with the other.

4. An extensible adjusting link comprising two members with overlapping end portions, said members at their overlapping portions being provided respectively with an external right hand thread and an external left hand thread, means between said overlapping portions urging them apart in a transverse direction, and an adjusting nut having sets of threads engaging respectively the threads of the link members.

5. An extensible adjusting link comprising two members with overlapping end portions, said members at their overlapping portions being provided respectively with an external right hand thread and an external left hand thread, means between said overlapping portions urging them apart in a transverse direction, and an adjusting nut having sets of threads engaging respectively the threads of the link members, said urging means comprising a generally longitudinally extending leaf spring.

6. An extensible adjusting ling comprising two members with overlapping end portions, said members at their overlapping portions being provided respectively with an external right hand thread and an external left hand thread, means between said overlapping portions urging them apart in a transverse direction, and an adjusting nut having sets of threads engaging respectively the threads of the link members, said urging means comprising a generally longitudinally extending leaf spring, said leaf spring being held in a face groove of one of said link members.

7. An extensible adjusting link comprising two members with overlapping end portions, said members at their overlapping portions being provided respectively with an external right hand thread and an external left hand thread, means between said overlapping portions urging them apart in a transverse direction, and an adjusting nut having sets of threads engaging respectively the threads of the link members, said urging means comprising a generally longitudinally extending leaf spring, said leaf spring being held in a face groove of one of said link members, and being in the form of a bow having its ends acting against the link member having the groove and its intermediate portion in substantially flatwise engagement with the opposing face of the other link member.

8. An extensible adjusting link comprising link members with overlapping inner end portions of half-round shape having external threads, the threads of the respective members being of opposite hand, a nut having a threaded portion with right hand and left hand threads engaging respectively the threads of the link members, and a deflection spring interposed between the overlapping portions of the link members.

9. An extensible adjusting link comprising link members with overlapping inner end portions of half-round shape having external threads, the threads of the respective members being of opposite hand, a nut having a threaded portion with right hand and left hand threads engaging respectively the threads of the link members, and a deflection spring interposed between the overlapping portions of the link members, said deflection spring having a shallow arc and being of substantially gerater length than the threaded portion of the nut.

10. An extensible adjusting link comprising link members with overlapping inner end portions of half-round shape having external threads, the threads of the respective members being of opposite hand, a nut having a threaded portion with right hand and left hand threads engaging respectively the threads of the link members, and a deflection spring interposed between the over-lapping portions of the link members, said deflection spring having a shallow arc and being of substantially greater length than the threaded portion of the nut, said nut having projecting centering sleeves at the ends.

ARTHUR CLAUD-MANTLE.